(12) United States Patent
Chen et al.

(10) Patent No.: US 8,302,741 B2
(45) Date of Patent: Nov. 6, 2012

(54) DISK BRAKE CALIPER WITH PARKING BRAKE

(75) Inventors: Yiming Chen, Shanghai (CN); Jianmin Gu, Shanghai (CN); Willson Sun, Shanghai (CN)

(73) Assignee: RWI Company Limited S.A., Luxembourg (LU)

( * ) Notice: Subject to any disclaimer, the term of this patent is extended or adjusted under 35 U.S.C. 154(b) by 260 days.

(21) Appl. No.: 12/749,882

(22) Filed: Mar. 30, 2010

(65) Prior Publication Data

US 2010/0252375 A1 Oct. 7, 2010

(51) Int. Cl.
*F16D 55/08* (2006.01)

(52) U.S. Cl. ............... 188/72.8; 188/71.8; 188/71.9

(58) Field of Classification Search .......... 188/72.8, 188/72.7, 72.9, 72.1, 72.3, 71.1, 71.7, 71.8, 188/71.9, 196 V
See application file for complete search history.

(56) References Cited

U.S. PATENT DOCUMENTS

| | | | |
|---|---|---|---|
| 3,827,534 A | 8/1974 | Brooks | |
| 5,060,765 A * | 10/1991 | Meyer | 188/71.9 |
| 5,586,623 A * | 12/1996 | Mery | 188/72.6 |
| 5,609,227 A * | 3/1997 | Mery | 188/72.7 |
| 5,697,475 A * | 12/1997 | Le Deit et al. | 188/72.9 |
| 5,788,024 A * | 8/1998 | Meyer | 188/72.7 |
| 5,868,225 A * | 2/1999 | Hulliger | 188/72.4 |
| 6,478,120 B2 * | 11/2002 | Runkel et al. | 188/71.9 |
| 6,651,784 B1 * | 11/2003 | Barbosa et al. | 188/71.9 |
| 6,659,236 B1 * | 12/2003 | Clark et al. | 188/79.52 |
| 6,749,044 B2 * | 6/2004 | Boisseau | 188/72.7 |
| 6,840,354 B2 | 1/2005 | Grundwurmer et al. | |
| 6,976,563 B1 | 12/2005 | Shaw | |
| 7,331,432 B2 * | 2/2008 | Watada | 188/72.7 |
| 7,490,703 B2 | 2/2009 | Maehara | |
| 7,523,815 B2 * | 4/2009 | Petri et al. | 188/71.9 |
| 8,069,961 B2 * | 12/2011 | Watada | 188/72.8 |
| 2009/0020378 A1 | 1/2009 | Watada et al. | |

\* cited by examiner

*Primary Examiner* — Robert A Siconolfi
*Assistant Examiner* — Mariano Sy
(74) *Attorney, Agent, or Firm* — Dickinson Wright PLLC

(57) ABSTRACT

A disk brake caliper with an integrated parking brake comprising a housing, a piston, an adjust screw, a ramp nut, a ramp nut return, a ramp shaft and a fix cage. The ramp nut has a body and a head at one end of the body. The fix cage is secured to the inner wall of the housing, which has a hollow structure and through which the body of the ramp nut passes. One of the fix cage and the head of the ramp nut is provided with a locking lug and the other of the fix cage and the head of the ramp nut is provided with a locking notch for mating with the locking lug to prevent the ramp nut from rotating relative to the housing.

17 Claims, 11 Drawing Sheets

DISK BRAKE CALIPER WITH PARKING BRAKE

BACKGROUND OF THE INVENTION

1. Field of the Invention

The present invention relates to a disk brake caliper with an integrated parking brake. This application claims the benefit and priority of Chinese Patent Application No. 200910128353.9, filed Mar. 30, 2009, which is incorporated herein by reference in its entirety.

2. Description of the Prior Art

The brake calipers having an integrated parking, or emergency, brake generally include a ramp nut locked by a screw going through a housing to prevent rotation of the ramp nut relative to the housing. Such a locking of the ramp nut with a screw involves the following disadvantages: first, there is the risk of liquid leaking out of the housing because the screw endures a lateral force from the ramp nut, and second, the wear of the ramp nut is exacerbated due to its uneven load condition.

SUMMARY OF THE INVENTION AND ADVANTAGES

The technical problem to be solved by the present invention is to provide a disk brake caliper with an integrated parking brake in which a ramp nut can be securely locked against rotation while preventing liquid from leaking out of the housing.

The invention provides for a disk brake caliper with an integrated parking brake including a housing presenting a housing inner wall defining a central bore. A ramp nut having a head is movably disposed in the central bore, and a fix cage is disposed about the ramp nut in the central bore. The fix cage is secured to the housing inner wall to prevent rotation of the fix cage relative to the housing. One of the fix cage and the head of the ramp nut presents a locking lug, and the other of the fix cage and the head of the ramp nut presents a locking notch or a locking slot for mating with the locking lug. The locking lug engages the locking notch to prevent rotation of the ramp nut relative to the housing.

The fix cage being secured to the inner wall of the housing is used to prevent rotation of the ramp nut relative to the housing while completely eliminating any leak of liquid out of the housing. Further, because the fix cage is fitted over the ramp nut, the ramp nut is subjected to an even load, thus increasing its life. The present invention further involves advantages of having a simple structure and being easy to assemble.

DETAILED DESCRIPTION OF THE INVENTION

Figure 1:
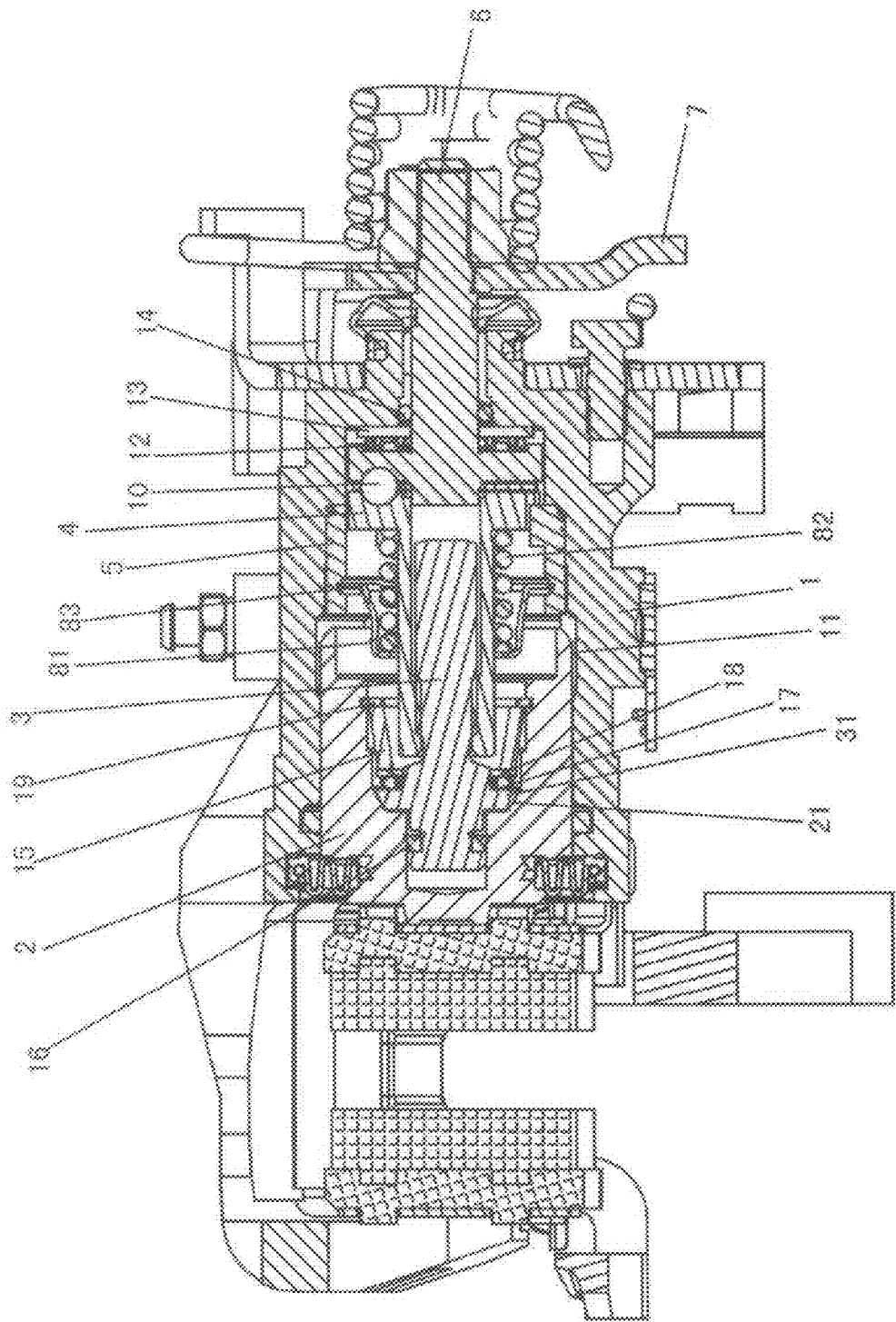
FIG. 1 is a schematic structural section view of a first embodiment of a disk brake caliper with parking brake of the present invention.
Figure 2:
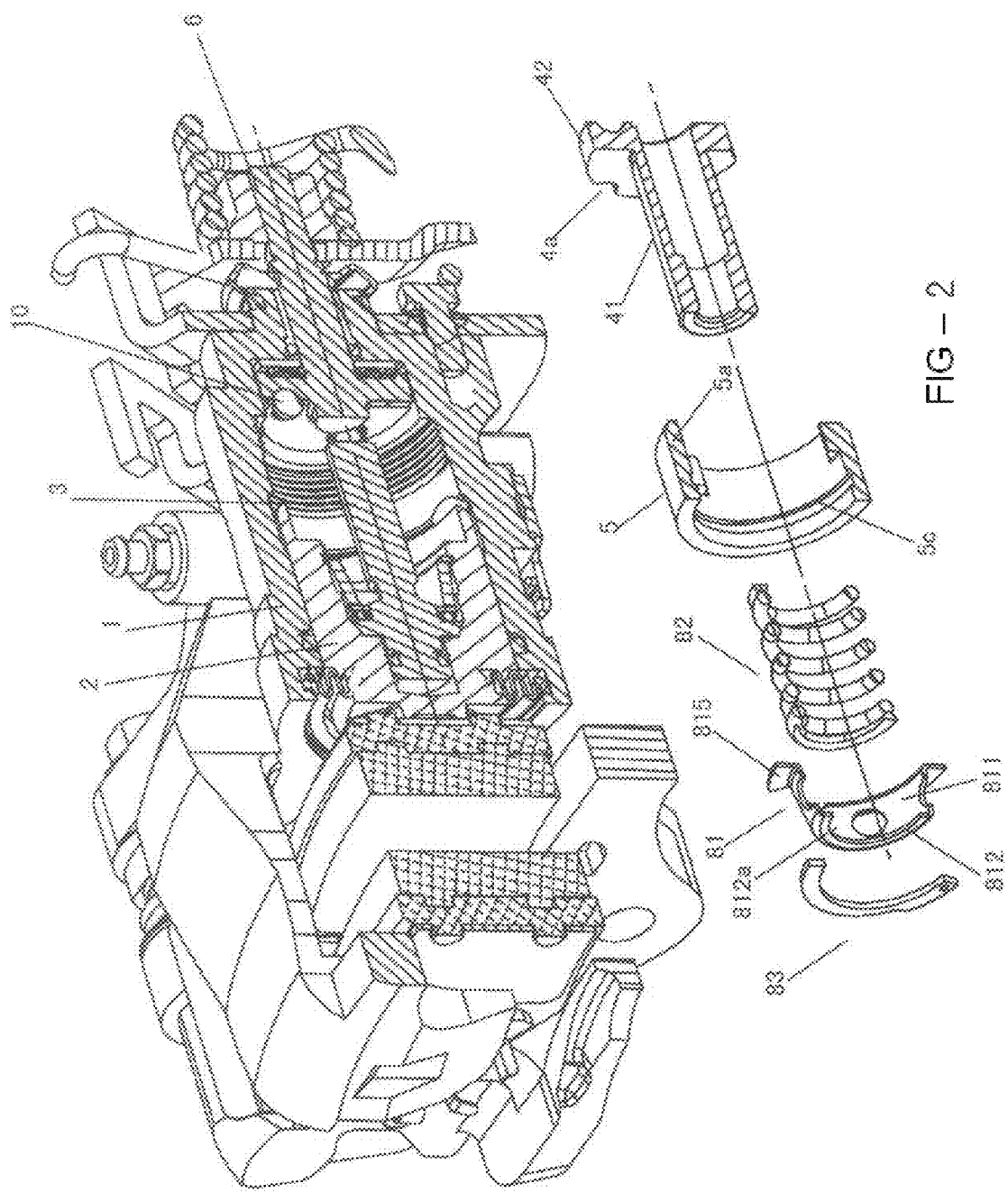
FIG. 2 is a schematic exploded view of a ramp nut, a fix cage and ramp nut return means of the first embodiment of the present invention.

FIG. 1 is a schematic structural sectional view of a first embodiment of a disk brake caliper with an integrated parking brake assembly. FIG. 2 is an exploded view of a ramp nut 4, a fix cage 5 and ramp nut return means of the first embodiment. Referring to FIGS. 1 and 2, the disk brake caliper includes a housing 1 extending along an axis, a piston 2, an adjust screw 3, a ramp nut 4, a ramp nut return means, a fix cage 5, a ramp shaft 6 and a ball bearing 10. The housing 1 presents a housing inner wall defining a central bore 11, in which the piston 2, the adjust screw 3, the ramp nut 4 and the fix cage 5 are all disposed. The ramp nut 4 comprises a body 41 and a head 42 at one end of the body 41. The ramp nut 4 is locked against rotation by the fix cage 5 and can only move in an axial direction. One end of the adjust screw 3 extends into the piston 2 and is sealed to the piston 2 with a dual lip ring seal 16. The adjust screw 3 is capable of forcing the piston 2 to move in the axial direction. The other end of the adjust screw 3 threadedly engages the body 41 of the ramp nut 4 by threads. A shoulder 31 of the adjust screw 3 is pressed against a tapered surface 21 of the piston 2 by a retainer spring 15. The retainer spring 15 is retained by a c-ring 19, which is secured to a groove in the piston 2. A washer 17 and a ball bearing 18 are disposed between the adjust screw 3 and the retainer spring 15 to reduce friction when the adjust screw 3 is rotating. The ramp shaft 6 applies an axial force on the ramp nut 4 to move the ramp nut 4 in the axial direction. The ramp shaft 6 extends from a first end outside of the central bore 11 of the housing 1 to a second end inside of the central bore 11 of the housing 1. The first end of the ramp shaft 6 is connected to a lever 7, which can be rotated about the axis to rotate to rotate the ramp shaft 6. A thrust bearing 12 and a washer 13 are fitted between the ramp shaft 6 and the housing inner wall for reducing friction between the ramp shaft 6 and the housing inner wall when the lever 7 and the ramp shaft 6 are rotating. A seal ring 14 is further fitted over the ramp shaft 6 to seal the ramp shaft 6 to the housing inner wall.

The fix cage 5 is secured to the housing inner wall of the housing 1. In the first embodiment, the outer wall of the fix cage 5 is provided with external threads and the inner wall of the housing 1 is provided with internal threads, and the fix cage 5 is fastened to the inner wall of the housing by the threads to prevent rotation of the fix cage 5 relative to the housing 1. It should be appreciated that any other means of securing the fix cage 5 to the housing inner wall while preventing rotation of the fix cage 5 relative to the housing 1 are also included in the scope of the invention. The fix cage 5 is of a hollow structure, and the body 41 of the ramp nut 4 passes through the fix cage 5. In other words, the fix cage 5 is disposed about the body 41 of the ramp nut 4. The inner wall of the fix cage 5 defines at least one locking lug 5a and the head 42 of the ramp nut 4 defines at least one locking notch 4a. The locking lugs 5a of the fix cage 5 engages the locking notches 4a of the ramp nut 4 to prevent rotation of the ramp nut 4 relative to the housing 1. The number of locking lugs 5a and locking notches 4a can be one or more. Preferably, three locking lugs 5a and three locking notches 4a are provided. The three locking lugs 5a are circumferentially spaced from one another. Since the locking notches 4a extend through the head 42 of the ramp nut 4, the ramp nut 4 remains axially movable. It should be appreciated that the locking lugs 5a could alternately be disposed on the head 42 of the ramp nut 4 and the locking notches 4a could be disposed on the inner wall of the fix cage 5.

In the first embodiment, the ramp nut return means comprises a hold down cage 81, a return spring 82 and a circlip 83. The return spring 82 is fitted on the body 41 of the ramp nut 4, and the hold down cage 81 is fitted over the return spring 82. The hold down cage 81 comprises a hollow, cylindrical body 811 and an end plate 812 provided on one end of the cylindrical body 811. A central through-hole 812a is provided on the end plate 812, which allows the body 41 of the ramp nut 4 to pass through the hold down cage 81. The outer wall of the other end of the cylindrical body 811 of the hold down cage 81a plurality of tabs 815 circumferentially spaced from one another. One end of the return spring 82 presses against the inner wall of the end plate 812, and the other end of the return spring 82 presses against the side surface of the head 42 of the ramp nut 4 opposite to the piston 2. The fix cage 5 further defines an annular groove 5c. The circlip 83 is embedded in the annular groove 5c and rests against the side surface of the tabs 815 opposite to the piston 2 to retain the hold down cage 81.

Figure 3A:
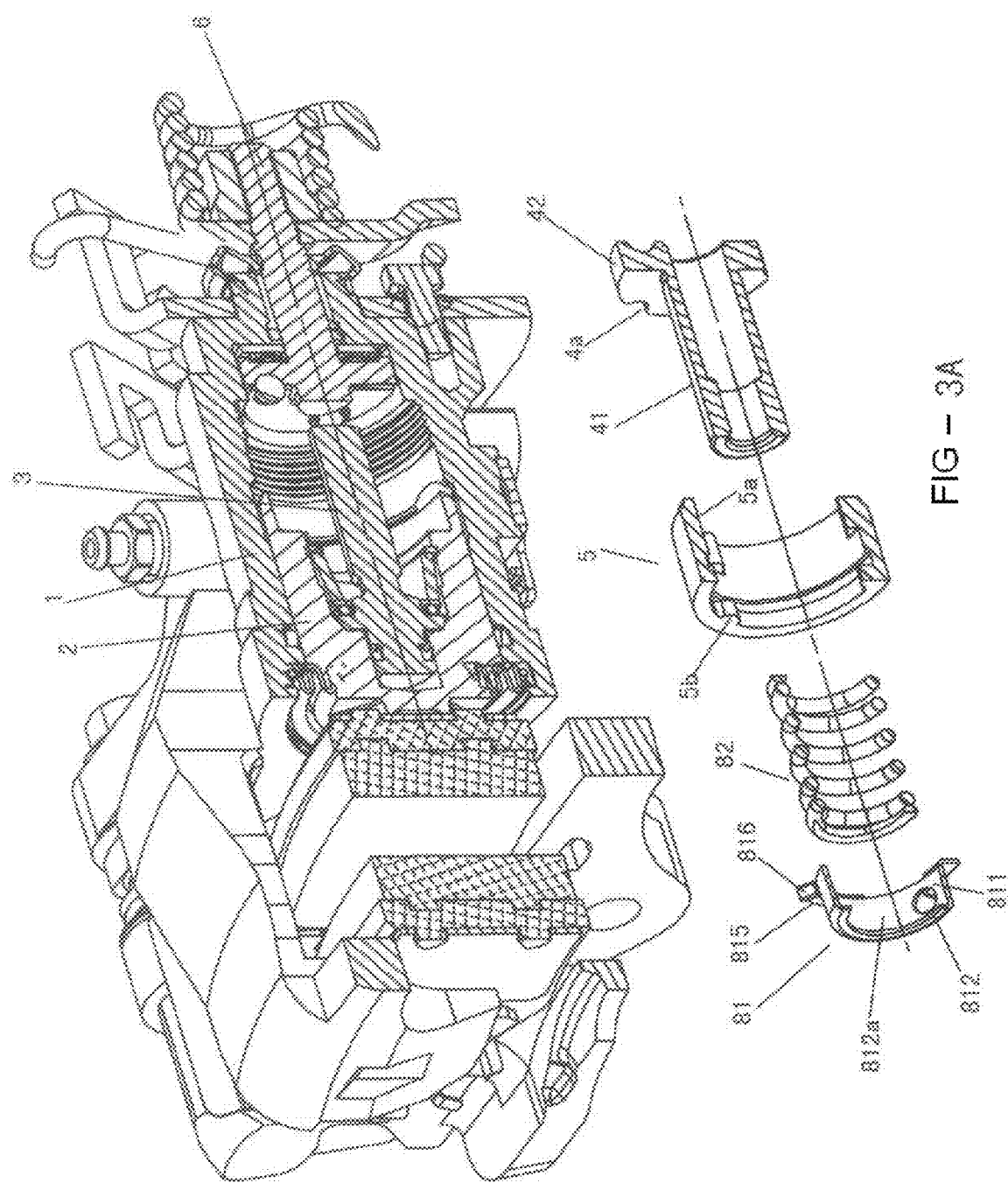
FIG. 3A is a schematic exploded view of a ramp nut, a fix cage and ramp nut return means of a second embodiment of the present invention.
Figure 3B:
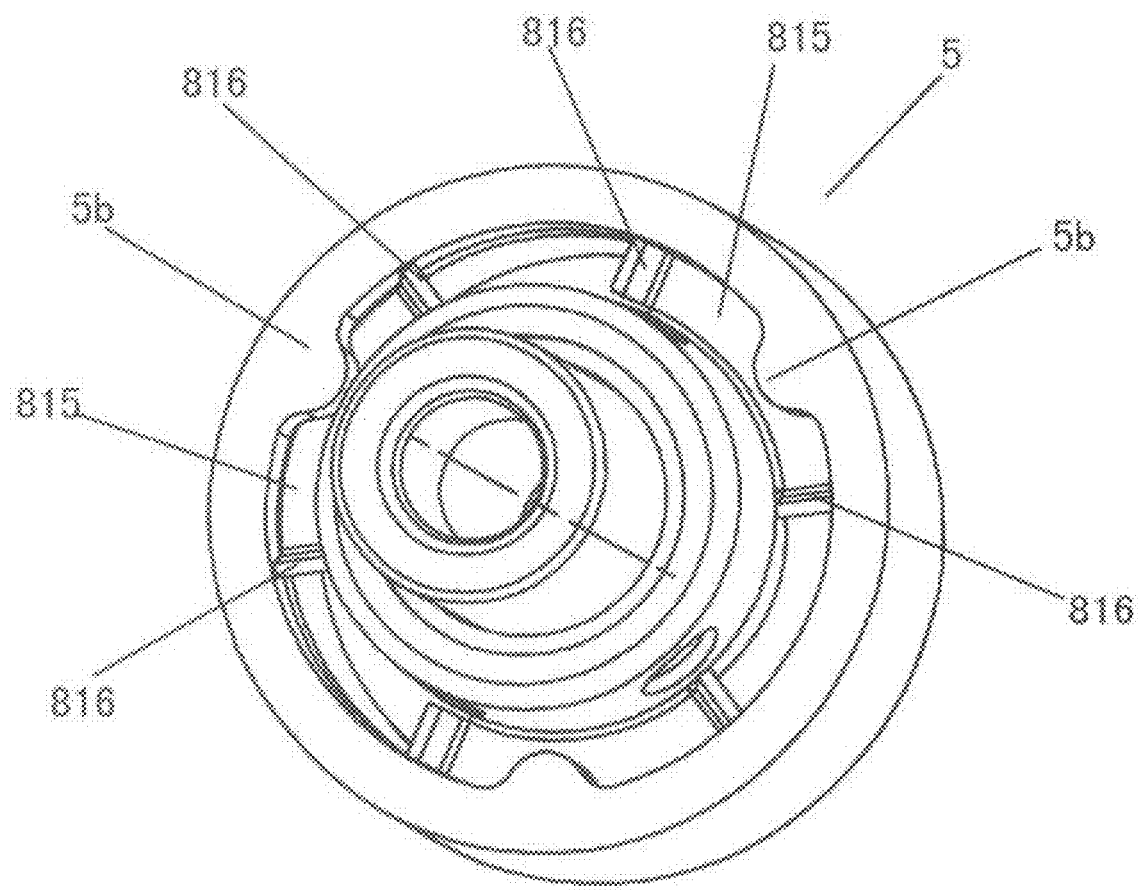
FIG. 3B is a schematic assembled view of the ramp nut, the fix cage and the ramp nut return means of the second embodiment of the present invention.

FIGS. 3A and 3B are a schematic exploded view and a schematic assembled view respectively of the ramp nut 4, the fix cage 5 and the ramp nut return means of a second embodiment. In the second embodiment, the fix cage 5 and the housing 1 are connected to each other by threads, similar to the first embodiment. A locking lug 5a is provided on the inner wall of one end of the fix cage 5, and a plurality of circumferentially spaced projections 5b are provided on the inner wall of the other end of the fix cage 5. The number of projections 5b is, for example, three but could be more or less than three. The head 42 of the ramp nut 4 defines a locking notch 4a for mating with the locking lug 5a. The fix cage 5 and the head 42 of the ramp nut 4 engage with each other by means of the locking lug 5a and the locking notch 4a to prevent the ramp nut 4 from rotating relative to the housing 1. The ramp nut return means comprises a hold down cage 81 and a return spring 82. The return spring 82 is fitted on the body 41 of the ramp nut 4 and the hold down cage 81 is fitted over the return spring 82. The hold down cage 81 comprises a hollow, cylindrical body 811. An end plate 812 is disposed on one end of the cylindrical body 811. A central through-hole 812a is provided on the end plate 812, which allows the body 41 of the ramp nut 4 to pass through the hold down cage 81. A plurality of circumferentially spaced tabs 815 corresponding to the plurality of projections 5b are provided on the outer wall of the other end of the cylindrical body 811. A flanged edge 816 is provided on either side of each tab 815. The fix cage 5 is fitted over the hold down cage 81 with the back surface of each projection 5b of the fix cage 5 abutting each tab 815 of the hold down cage 81. Each projection 5b is positioned between two flanged edges 816 of a corresponding tab 815. One end of the return spring 82 presses against the inner wall of the end plate 812 of the hold down cage 81, and the other end of the return spring 82 presses against the surface of the head 42 of the ramp nut 4 opposite to the piston 2.

Figure 4:
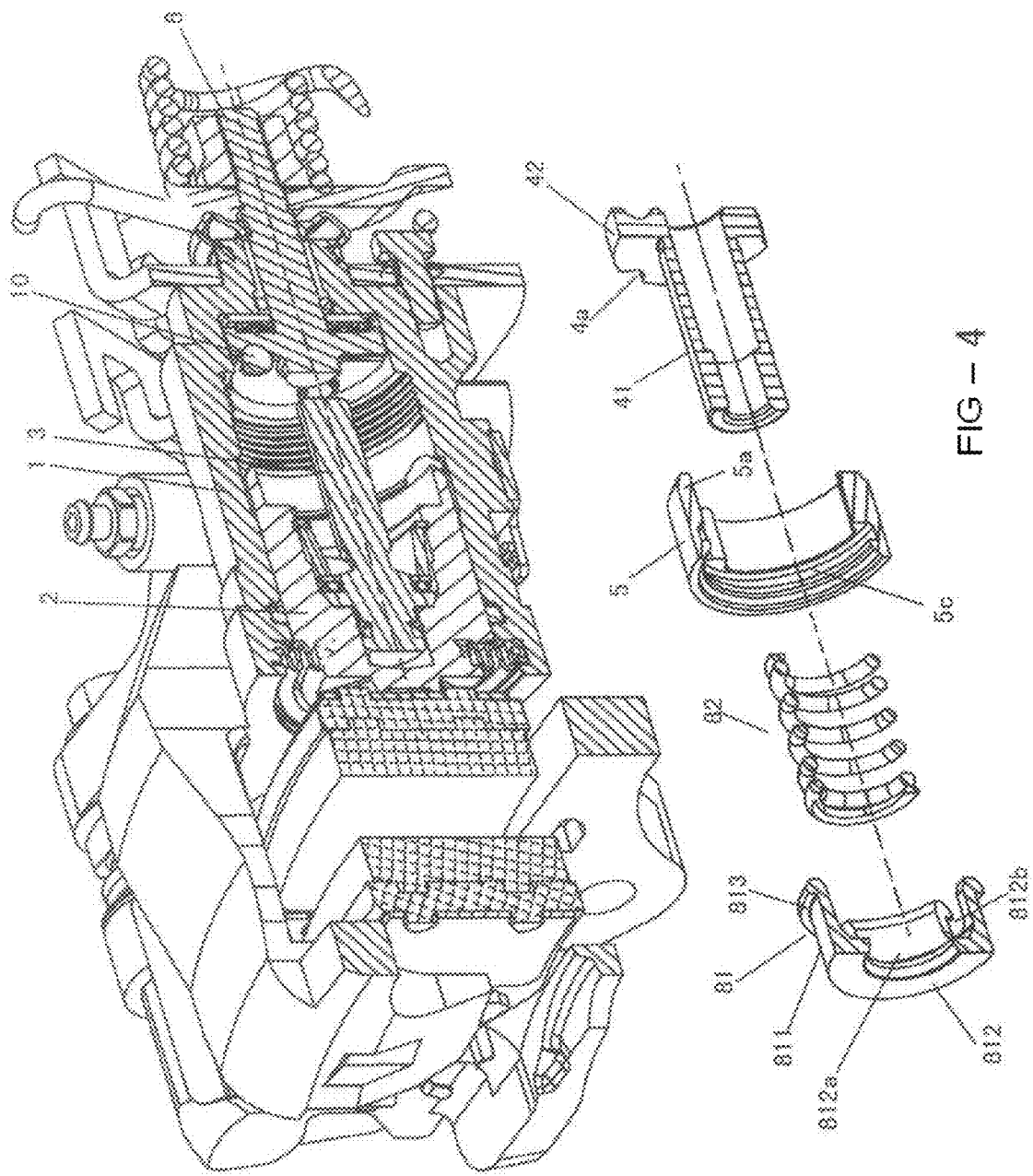
FIG. 4 is a schematic exploded view of a ramp nut, a fix cage and ramp nut return means of a third embodiment of the present invention.

FIG. 4 shows an exploded view of a ramp nut 4, a fix cage 5 and ramp nut return means of the third embodiment. In the third embodiment, the fix cage 5 and the housing 1 are connected to each other by threads, similar to the first embodiment. The inner wall of the fix cage 5 presents a locking lug 5a and an annular groove 5c, and the head 42 of the ramp nut 4 presents a locking notch 4a mating with the locking lug 5a. The fix cage 5 and the head 42 of the ramp nut 4 engage with each other by means of the locking lug 5a and the locking notch 4a so as to lock the ramp nut 4 against rotation relative to the housing 1. The ramp nut return means comprises a hold down cage 81 and a return spring 82. The return spring 82 is fitted on the body 41 of the ramp nut 4, and the hold down cage 81 is fitted over the return spring 82. The hold down cage 81 comprises a hollow, cylindrical body 811 and an end plate 812 is on one end of the cylindrical body 811. A central through-hole 812a is provided on the end plate 812, which allows the body 41 of the ramp nut 4 to pass through. The inner wall of the fix cage 5 presents an annular groove 5c, and the cylindrical body 811 of the hold down cage 81 presents a flange 813 extending into and engaging the annular groove 5c. The cylindrical body 811 of the hold down cage 81 further defines a cutout 812b extending axially through the flange 813. The hold down cage 81 of the present embodiment may be made of plastic and thus, by means of the cutout 812b, the flange 813 of the hold down cage 81 can be press fitted into the annular groove 5c of the fix cage 5 even if the outer diameter of the hold down cage 81 may vary, leading to easier assembly and reduced manufacturing costs. One end of the return spring 82 presses against the inner wall of the end plate 812 of the hold down cage 81, and the other end of the return spring 82 presses against the surface of the head 42 of the ramp nut 4 opposite to the piston 2.

Figure 5:
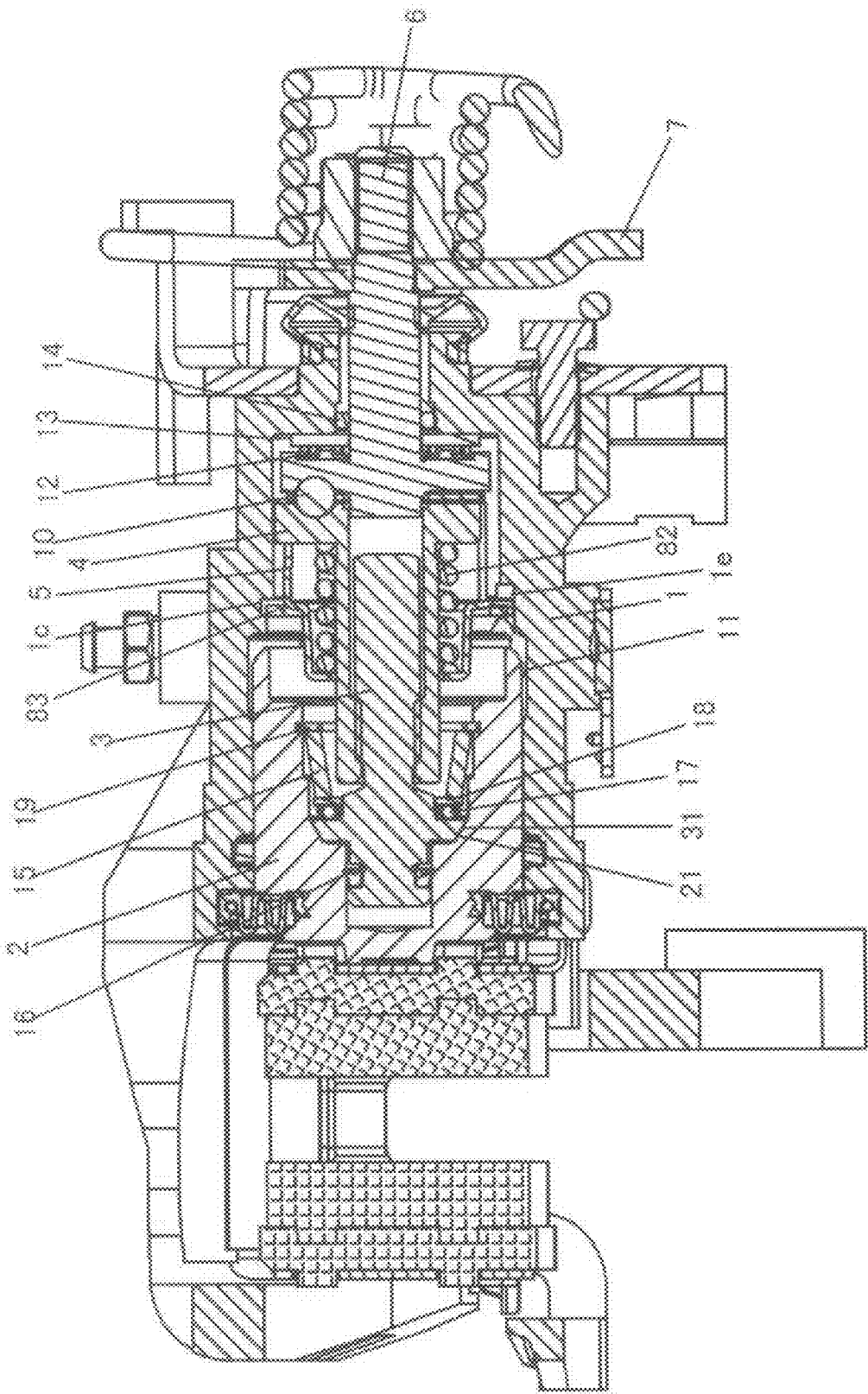
FIG. 5 is a schematic structural section view of a fourth embodiment of a disk brake caliper with parking brake of the present invention.
Figure 6A:
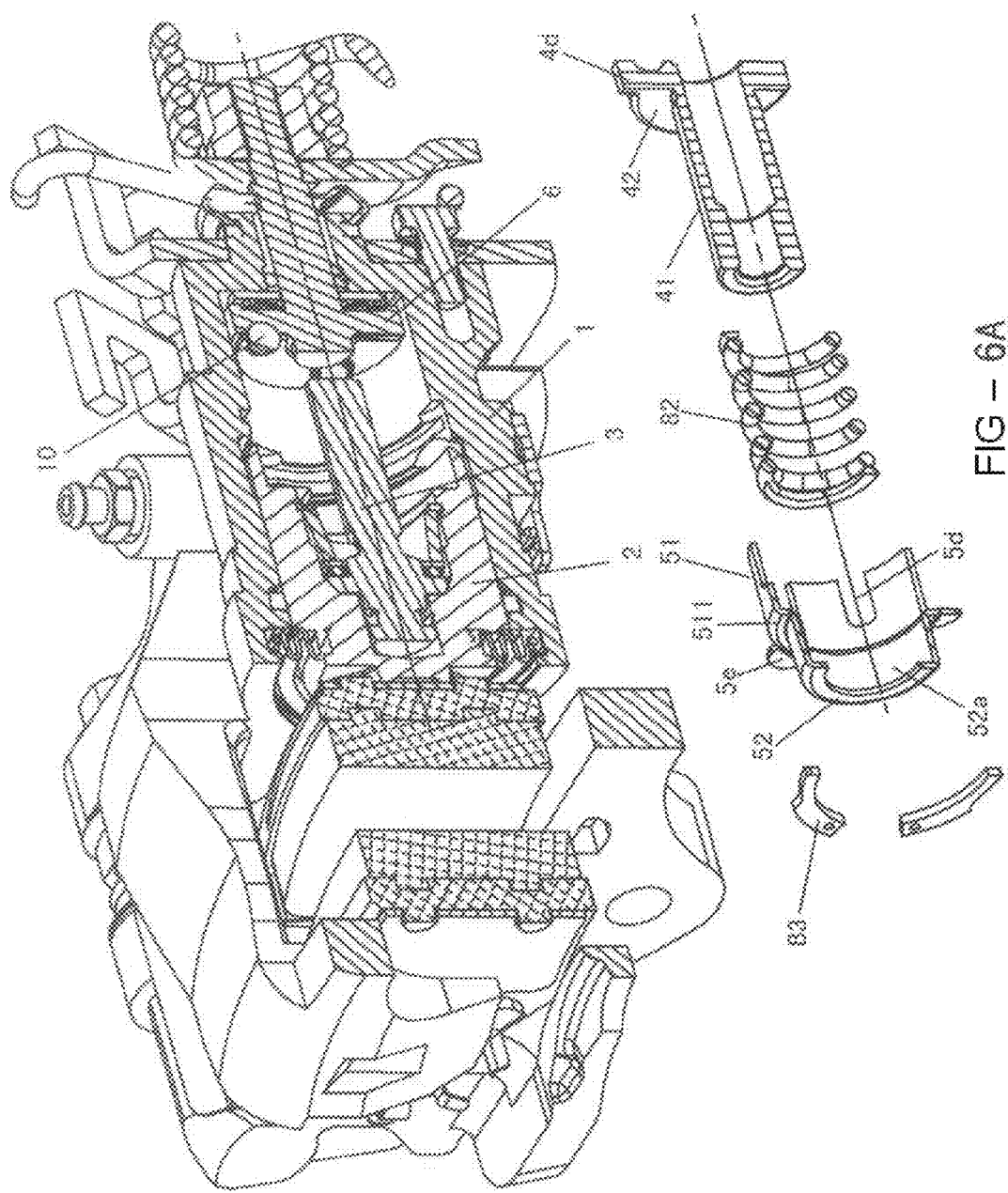
FIG. 6A is a schematic exploded view of a ramp nut, a fix cage and ramp nut return means of the fourth embodiment of the present invention.
Figure 6B:
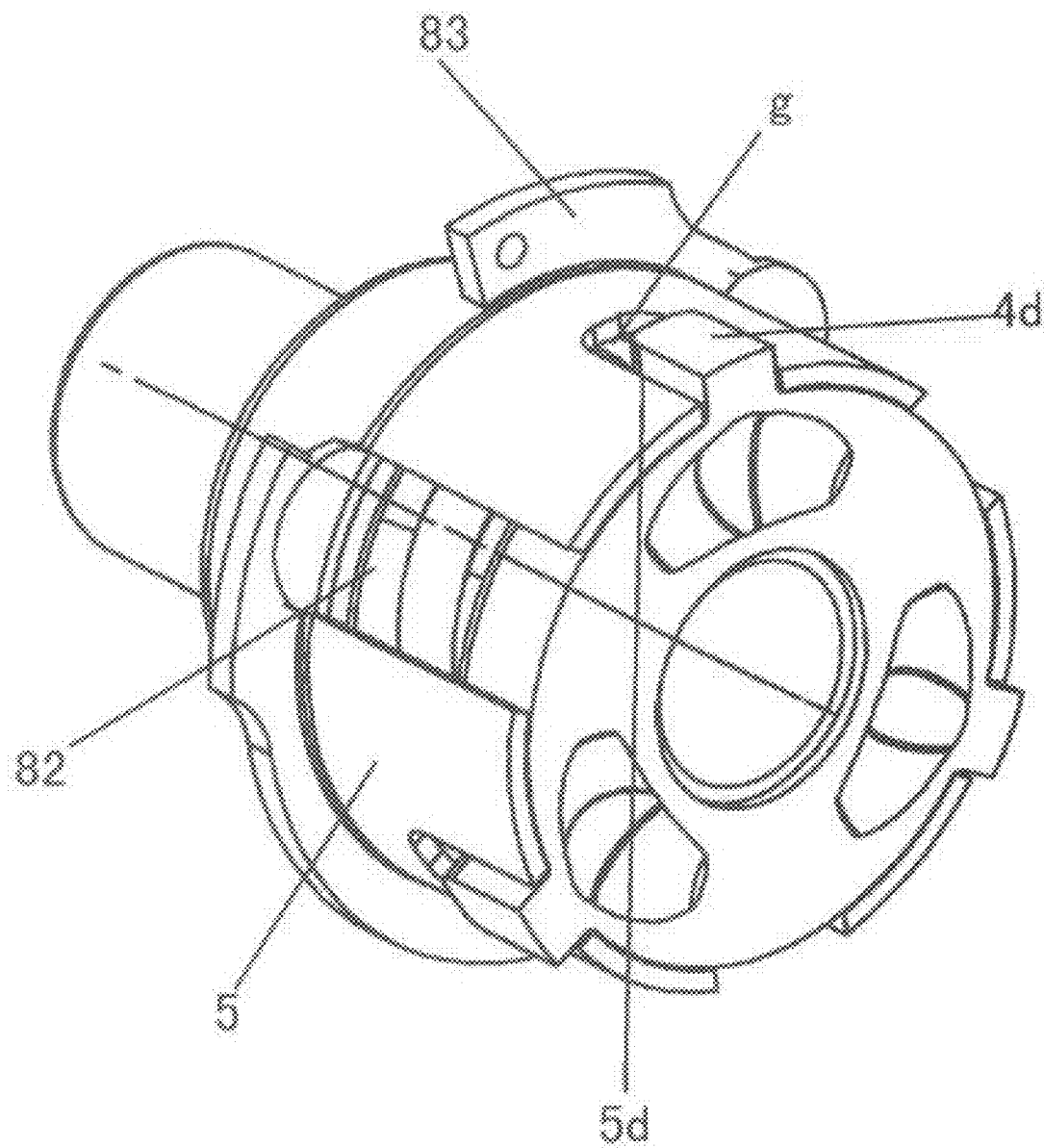
FIG. 6B is a schematic assembled view of the ramp nut, the fix cage and the ramp nut return means of the fourth embodiment of the present invention.

FIGS. 5, 6A and 6B show a fourth embodiment. The fourth embodiment includes a fix cage 5 having a cylindrical body 51. An end plate 52 is provided on one end of the cylindrical body 51, and a central through-hole 52a is provided on the end plate 52 to allow the body 41 of the ramp nut 4 to pass through the fix cage 5. The outer wall of the cylindrical body 51 of the fix cage 5 defines a step 511 and at least one ear 5e. The housing 1 defines an annular groove 1c and at least one ear notch 1e for mating with the ears 5e of the fix cage 5. The ears 5e are embedded in the ear notches 1e on the inner wall of the housing 1 to secure the fix cage 5 to the housing 1. The number of the ears 5e on the fix cage 5 is, for example, three but could be more or less than three. The outer wall of the head 42 of the ramp nut 4 defines a locking lug 4d, and the outer wall of the fix cage 5 defines a locking slot 5d. The locking lug 4d of the ramp nut 4 engages the locking slot 5d of the fix cage to prevent rotation of the ramp nut 4 relative to the housing 1. Further, there is a gap g between the locking lug 4d and the bottom of the locking slot 5d so that the locking lug 4d is axially movable in the locking slot 5d. In other words, the ramp nut 4 is movable in the axial direction but cannot rotate relative to the housing 1. The number of the locking lugs 4d and locking slots 5d can be one or more. Preferably three locking lugs 4d and three locking slots 5d are provided. The three locking lugs 4d are provided on the outer wall of the head 42 of the ramp nut 4 and are spaced circumferentially from one another. The ramp nut return means includes a return spring 82 and a circlip 83. The return spring 82 is fitted on the body 41 of the ramp nut 4, and the fix cage 5 is fitted over the return spring 82. One end of the return spring 82 presses against the inner wall of the end plate 52 of the fix cage 5 and the other end of the return spring 82 presses against the side surface of the head 42 of the ramp nut 4 opposite to the piston 2. The circlip 83 is embedded in the annular groove 1c of the housing 1 and presses against the step 511 of the cylindrical body 51 of the fix cage 5 to secure the fix cage 5 to the housing 1.

Figure 7:
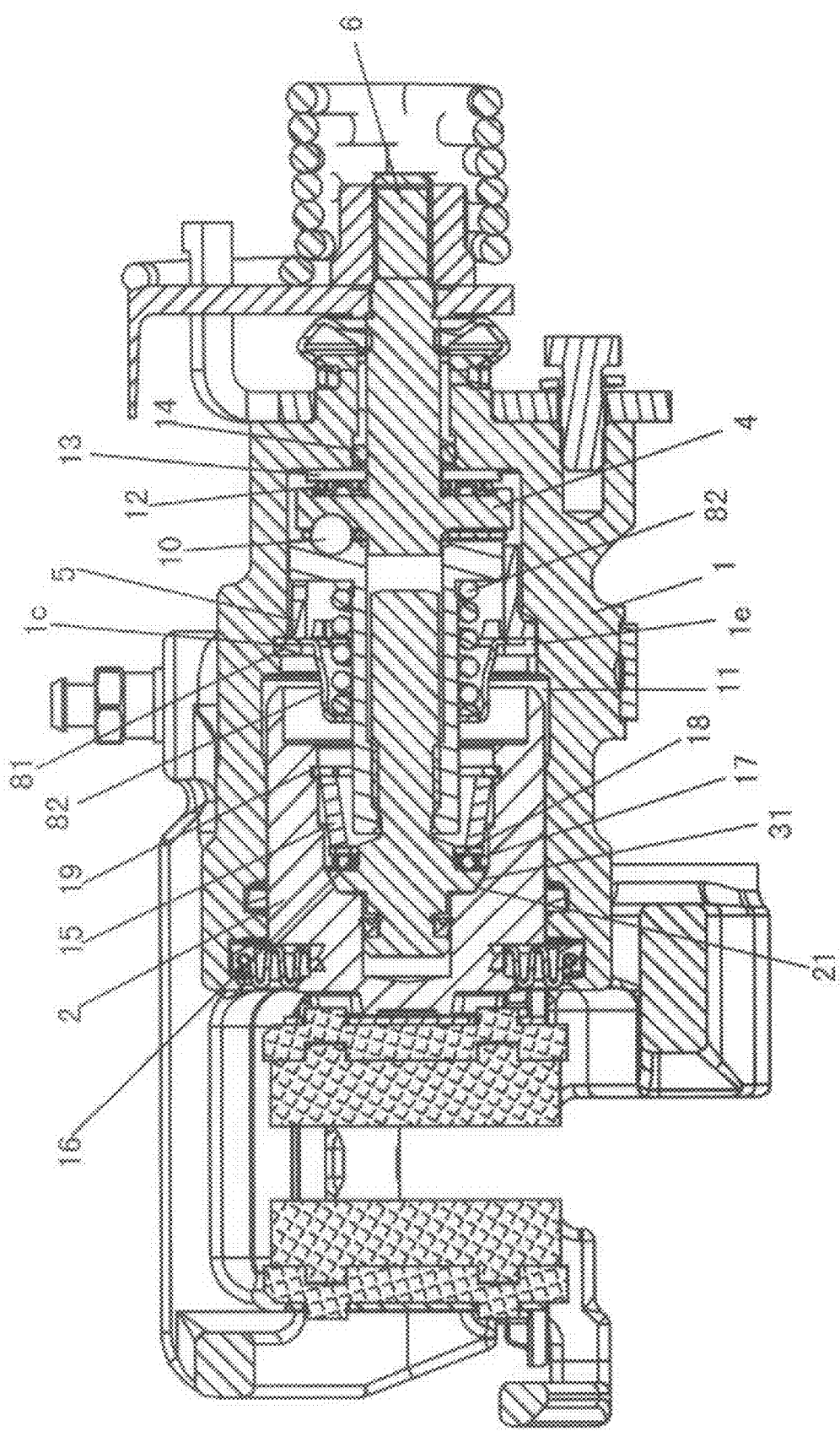
FIG. 7 is a schematic structural sectional view of a fifth embodiment of a disk brake caliper with parking brake of the present invention.
Figure 8A:
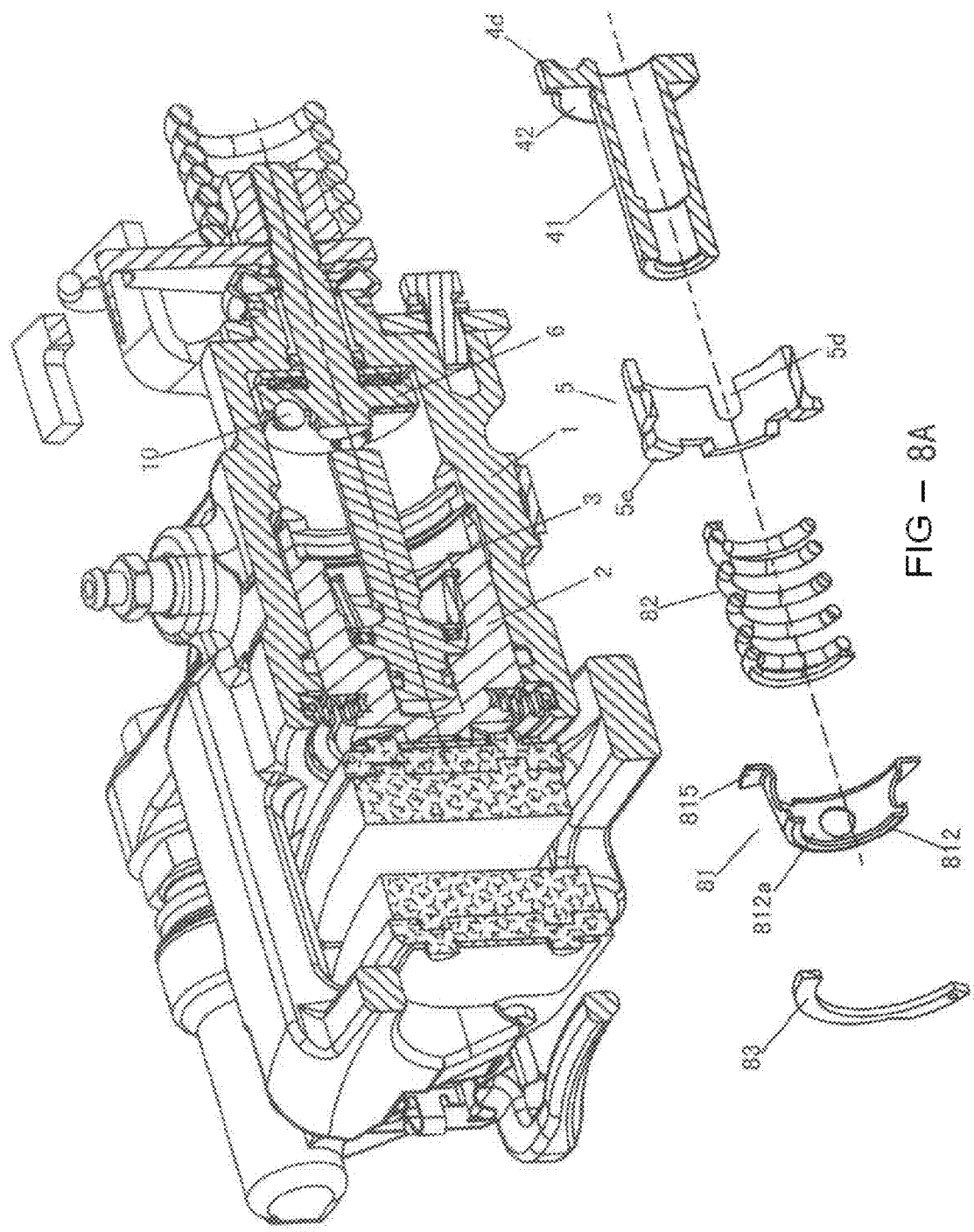
FIG. 8A is a schematic exploded view of a ramp nut, a fix cage and ramp nut return means of the fifth embodiment of the present invention.
Figure 8B:
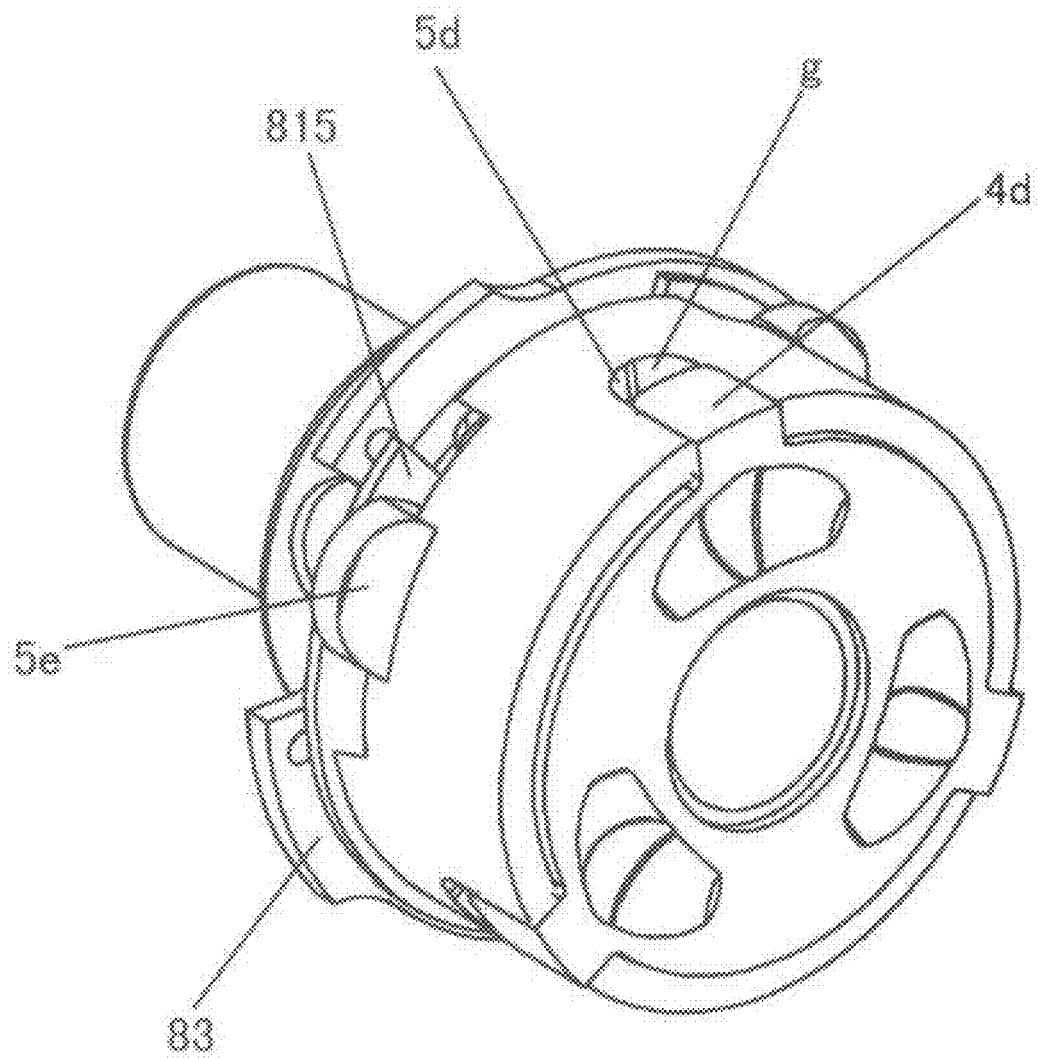
FIG. 8B is a schematic assembled view of the ramp nut, the fix cage and the ramp nut return means of the fifth embodiment of the present invention.

FIGS. 7, 8A and 8B show a fifth embodiment. The outer wall of the fix cage 5 of the fifth embodiment defines a plurality of ears 5e, and the housing 1 defines an annular groove 1c and a plurality of ear notches 1e for mating with the ears 5e of the fix cage 5. The ears 5e of the fix cage 5 are embedded in the ear notches 1e of the housing 1. The outer wall of the head 42 of the ramp nut 4 defines at least one locking lug 4d, and the outer wall of the cylindrical body 51 of the fix cage 5 defines at least one locking slot 5d. The locking lugs 4d of the ramp nut 4 engage the locking slots 5d of the fix cage 5 to prevent rotation of the ramp nut 4 relative to the housing 1. Further, there is a gap g between the locking lug 4d and the bottom of the locking slot 5d so that the locking lug 4d is axially movable in the locking slot 5d. In other words, the ramp nut 4 is movable in the axial direction but cannot rotate relative to the housing 1. The ramp nut return means includes a hold down cage 81, a return spring 82 and a circlip 83. The return spring 82 is fitted on the body 41 of the ramp nut 4, and the hold down cage 81 is fitted over the return spring 82. The hold down cage 81 comprises a hollow, cylindrical body 811 and an end plate 812 provided on one end of the cylindrical body 811. The end plate 812 presents a central through-hole 812a to allow the body 41 of the ramp nut 4 to pass through the fix cage 5. The outer wall of the other end of the cylindrical body 811 of the hold down cage 81 defines a plurality of tabs 815 circumferentially spaced from one another. One end of the return spring 82 presses against the inner wall of the end plate 812 of the hold down cage 81 and the other end of the return spring 82 presses against the side surface of the head 42 of the ramp nut 4 opposite to the piston 2. The circlip 83 is embedded in the annular groove 1c of the housing and presses against the side surface of the tabs 815 of the cylindrical body 811 of the hold down cage 81 opposite to the piston 2.

What is claimed is:

1. A disk brake caliper with an integrated parking brake assembly comprising:
    a housing extending along an axis and presenting a housing inner wall defining a central bore,
    a ramp nut slidably disposed in said central bore of said housing and including a body,
    a fix cage disposed about said ramp nut in said central bore of said housing and secured to said housing inner wall to prevent rotation between said fix cage and said housing wherein one of said ramp nut and said fix cage presents a locking lug and the other of said ramp nut and said fix cage presents a locking notch for mating with said locking lug to prevent rotation of said ramp nut relative to said housing, and
    a ramp nut return means including a hold down cage secured to said fix cage and disposed about said ramp nut and wherein said ramp nut return means includes a return spring extending between said hold down cage and said ramp nut for biasing said ramp nut in said axial direction.

2. The assembly as set forth in claim 1 wherein said fix cage presents said locking lug and said ramp nut presents said locking notch for mating with said locking lug.

3. The assembly as set forth in claim 1 wherein said ramp nut presents said locking lug and said fix cage presents said locking notch.

4. The assembly as set forth in claim 1 wherein said fix cage presents an annular groove and said hold down cage presents a plurality of circumferentially spaced tabs and said ramp nut return means includes a circlip embedded in said annular groove of said fix cage and pressing against said tabs of said hold down cage to secure said hold down cage to said fix cage.

5. The assembly as set forth in claim 1 wherein said fix cage presents an annular groove and said hold down cage presents a flange and a cutout extending axially through said flange for press fitting said flange of said hold down cage into said annular groove of said fix cage to secure said hold down cage to said fix cage.

6. The assembly as set forth in claim 1 wherein said fix cage defines a fix cage inner wall presenting a plurality of projections extending radially inwardly and said hold down cage presents a plurality of tabs with each side of each tab defining a flanged edge and each of said projections of said fix cage is positioned between said flanged edges of a corresponding tab of said hold down cage to secure said hold down cage to said fix cage.

7. The assembly as set forth in claim 1 wherein said fix cage is threadedly secured to said housing inner wall of said housing.

8. The assembly as set forth in claim 1 wherein said fix cage defines a fix cage outer wall presenting a plurality of ears extending radially outwardly and said housing inner wall of said housing presents a plurality of ear notches for receiving said ears of said fix cage to secure said fix cage to said housing inner wall.

9. The assembly as set forth in claim 1 further including a piston slidably disposed in said central bore of said housing for moving in an axial direction.

10. The assembly as set forth in claim 9 further including an adjust screw disposed in said central bore and having a first end extending into said piston for moving said piston in said axial direction and having a second end threadedly engaging said body of said ramp nut.

11. The assembly as set forth in claim 10 further including a ramp shaft extending from a first end outside of said central bore of said housing to a second end engaging said ramp nut inside of said central bore of said housing for moving said ramp nut in said axial direction.

12. The assembly as set forth in claim 11 further including a lever engaging said first end of said ramp shaft for rotating said ramp shaft.

13. A disk brake caliper with an integrated parking brake assembly comprising:
    a housing extending along an axis and presenting a housing inner wall defining a central bore,
    a piston slidably disposed in said central bore of said housing for moving in an axial direction,
    a ramp nut slidably disposed in said central bore of said housing and including a body and a head on one end of said body,
    an adjust screw disposed in said central bore and having a first end extending into said piston for moving said piston in said axial direction and having a second end threadedly engaging said body of said ramp nut,
    a ramp shaft extending along said axis from a first end outside of said central bore of said housing to a second end engaging said ramp nut inside of said central bore of said housing for moving said ramp nut in said axial direction, a lever engaging said first end of said ramp shaft for rotating said ramp shaft about said axis, a thrust bearing disposed between said ramp shaft and said housing inner wall for reducing friction between said ramp shaft and said housing inner wall when said ramp shaft is rotated by said lever, a fix cage having a hollow structure disposed about said ramp nut and presenting a fix cage inner wall disposed about said ramp nut in said central bore of said housing and secured to said housing inner wall to prevent rotation between said fix cage and said housing, wherein said body of said ramp nut passes through said hollow structure of said fix cage and wherein at least one of said head of said ramp nut and said fix cage presents a locking lug and the other of said head of said ramp nut and said fix cage presents a locking notch for mating with said locking lug to prevent rotation of said ramp nut relative to said housing, and a ramp nut return means including a hold down cage disposed in said central bore of said housing and secured to said fix cage and disposed about said ramp nut and wherein said ramp nut return means includes a return spring extending between said hold down cage and said ramp nut for biasing said ramp nut in said axial direction.

14. The assembly as set forth in claim 13 wherein:
said fix cage presents an annular groove,
said hold down cage of plastic and having a body being hollow and cylindrical and including an end plate presenting a through-hole and including a plurality of circumferentially spaced tabs extending outwardly from said hold down cage,
said ramp nut passes through said through-hole of said end plate of said hold down cage,
said return spring extending between said end plate of said hold down cage and said head of said ramp nut,
said ramp nut return means includes a circlip embedded in said annular groove of said fix cage and pressing against said tabs of said hold down cage to secure said hold down cage to said fix cage, said fix cage and said housing inner wall of said housing are threadedly engaged to one another, and
said fix cage presents said locking lug and said ramp nut presents said locking notch.

15. The assembly as set forth in claim 13 wherein:
said fix cage presents an annular groove,
said hold down cage of plastic and having a body being hollow and cylindrical and including an end plate presenting a through-hole and including a flange extending outwardly from said body to engage said annular groove of said fix cage,
said ramp nut passes through said through-hole of said end plate of said hold down cage,
said hold down cage further presents a cutout extending axially through said flange for press fitting said flange of said hold down cage into said annular groove of said fix cage, and
said return spring extending between said end plate of said hold down cage and said head of said ramp nut.

16. The assembly as set forth in claim 13 wherein:
said fix cage inner wall of said fix cage defines a plurality of projections extending radially inwardly,
said hold down cage of plastic and having a body being hollow and cylindrical and presenting a hold down cage outer wall and including an end plate presenting a through-hole,
said ramp nut passes through said through-hole of said end plate of said hold down cage, said hold down cage outer wall of said hold down cage defines a plurality of tabs corresponding with said projections of said fix cage and each side of each of said tabs presents a flanged edge, and
each of said projections of said fix cage is positioned between said flanged edges of a corresponding tab of said hold down cage for securing said hold down cage to said fix cage.

17. The assembly as set forth in claim 13 wherein said fix cage defines a fix cage outer wall presenting a plurality of ears extending radially outwardly and an end plate presenting a through-hole,
said ramp nut extends through said through-hole of said fix cage,
said housing inner wall defines an annular groove including a plurality of ear notches for receiving said ears of said fix cage to secure said fix cage to said housing inner wall, and
said ramp nut return means includes a circlip embedded in said annular groove of said housing inner wall of said housing and pressing against said fix cage.

* * * * *

UNITED STATES PATENT AND TRADEMARK OFFICE
CERTIFICATE OF CORRECTION

PATENT NO. : 8,302,741 B2  Page 1 of 1
APPLICATION NO. : 12/749882
DATED : November 6, 2012
INVENTOR(S) : Yiming Chen et al.

It is certified that error appears in the above-identified patent and that said Letters Patent is hereby corrected as shown below:

On the title page, item (73) Assignee: "RWI" should be --BWI--

Signed and Sealed this
Eighth Day of July, 2014

Michelle K. Lee
*Deputy Director of the United States Patent and Trademark Office*